United States Patent Office 3,299,107
Patented Jan. 17, 1967

3,299,107
17 - (UNSATURATED HYDROCARBON - SUBSTITUTED)-3-HYDROXYIMINO-5α - ANDROSTAN-17β-OLS, ALKYL AND ACYL DERIVATIVES THEREOF
Robert H. Mazur, Deerfield, Ill., assignor to G. D. Searle & Co., Chicago, Ill., a corporation of Delaware
No Drawing. Filed Feb. 12, 1965, Ser. No. 432,413
12 Claims. (Cl. 260—397.5)

The present invention relates to novel steroidal oximino derivatives and, more specifically, to 17-(unsaturated hydrocarbon-substituted)-3 - hydroxyimino - 5α - androstan-17β-ols, and the alkyl and acyl derivatives thereof characterized by the following structural formula

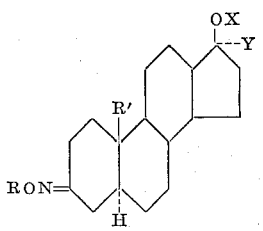

wherein R can be hydrogen, a lower alkyl, lower alkanoyl, halobenzoyl (lower alkoxy)benzoyl or diphenylacetyl radical, R' is either hydrogen or a methyl radical, X can be hydrogen, a lower alkanoyl or diphenylacetyl radical, and Y is a lower aliphatic mono-unsaturated hydrocarbon radical.

Examples of lower alkyl radicals depicted in the foregoing representation are methyl, ethyl, propyl, butyl, pentyl, hexyl, heptyl, and the branched-chain isomers thereof. The lower alkoxy radicals therein symbolized are represented by the formula —O—(lower alkyl)

and the lower alkanoyl groups are those within the scope of the following formula

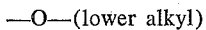
—C—(lower alkyl)

The lower aliphatic mono-unsaturated hydrocarbon radicals are those defined by the following formulas $C_nH_{2n-1}$ and $C_nH_{2n-3}$ wherein $n$ is a positive integer greater than one and less than 8, and are typified by ethynyl, propynyl, butynyl, pentynyl, hexynyl, heptynyl, propargyl, vinyl, allyl, propenyl, butenyl, crotyl, pentenyl, hexenyl, heptenyl, and the branched-chain groups isomeric therewith.

The compounds of this invention are conveniently produced by processes utilizing as intermediates the 17-(lower alkynyl)-3-keto compounds represented by the following structural formula

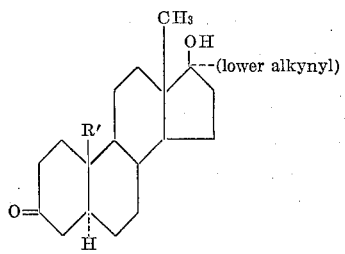

wherein R' is as hereinbefore defined. Those intermediates in which R' is a methyl group can be obtained by utilizing as starting materials compounds of the structural formula

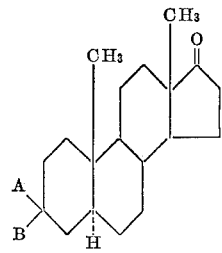

wherein A is hydrogen and B is a hydroxy group or A and B together comprise a ketal function. Typically, 3β-hydroxy-5α-androstan-17-one is contacted with a lower alkyne such as acetylene in the presence of a suitable catalyst, for example potassium tertiary-butoxide, to produce 17α-ethynyl-5α-androstane-3β,17β-diol. Oxidation of that diol, suitably with chromium trioxide in pyridine, affords the desired intermediate, i.e., 17α-ethynyl-17β-hydroxy-5α-androstan-3-one. An alternate route to the latter intermediate involves the ethynylation of 5α-androstane-3,17-dione 3-dimethyl ketal, using the aforementioned conditions. The resulting 17α - ethynyl - 17β-hydroxy-5α-androstan-3-one 3-dimethyl ketal is converted to the corresponding 3-ketone by reaction with p-toluenesulfonic acid in acetone.

A preferred procedure for the manufacture of those intermediates wherein R' is hydrogen involves reduction of the corresponding 4,5-dehydro compounds with lithium and liquid ammonia under the conditions described by Bowers et al., J. Am. Chem. Soc., 79, 4556 (1957). By that method, 17α-ethynyl-17β-hydroxyestr-4-en-3-one is converted to 17α-ethynyl-17β-hydroxy-5α-estran-3-one.

Partial reduction of the aforementioned 17α-(lower alkynyl)-3,17-diol intermediates, suitably by means of catalytic hydrogenation using a palladium-on-carbon catalyst at atmospheric pressure and room temperature, affords the 17α-alkenyl compounds. Oxidation of the resulting diols with chromium trioxide in pyridine results in the 3-keto intermediates of this invention. As a specific example of those processes, 17α-ethynyl-5α-androstane-3β, 17β-diol is shaken in pyridine with hydrogen and 5% palladium-on-carbon catalyst at atmospheric pressure and room temperature to yield 17α-vinyl-5α-androstane-3β, 17β-diol. Reaction at room temperature of the latter compound with chromium trioxide in pyridine results in 17β-hydroxy-17α-vinyl-5α-androsten-3-one.

When the 3-keto-17β-hydroxy intermediates of this invention are allowed to react with a mixture of a lower alkanoic acid and a lower alkanoic acid anhydride in the presence of an acid catalyst, the 17-(lower alkanoyl)-oxy-3-(enol lower alkanoates) are produced. The reaction of 17α-ethynyl-17β-hydroxy-5α-androstan-3-one with acetic acid and acetic anhydride in the presence of p-toluenesulfonic acid thus affords 17α-ethynyl-5α-androst-2-ene-3,17β-diol, 3,17-diacetate. Cleavage of the enol alkanoate function, typically with an inorganic alkali, affords the corresponding 3-keto substances. Thus, the aforementioned 17α-ethynyl-5α-androst-2-ene-3,17β-diol 3,17-diacetate is contacted with potassium carbonate in aqueous methanol at room temperature for a short time to yield the instant intermediate, 17β-acetoxy-17α-ethynyl-5α-androstan-3-one.

The 3-hydroxyimino substances of the present invention are produced by reaction of the above-described 3-keto intermediates with hydroxylamine, preferably in the form of its acid-addition salt, in the presence of a suitable acid acceptor. The process involved is specifically illustrated by the reaction of 17α-ethynyl-17β-hydroxy-5α-androstan-3-one with hydroxylamine hydrochloride and pyridine at steam bath temperature for about one hour to yield 17α-ethynyl-3-hydroxyimino-5α-androstan-17β-ol. When an alkoxyamine is substituted for hydroxylamine, the instant alkoxyimino compounds are produced. Reaction of the latter 3-keto intermediate with methoxyamine hydrochloride and pyridine thus results in 17α-ethynyl-3-methoxyimino-5α-androstan-17β-ol.

The 3-acyloxyimino compounds of the present invention are preferably obtained by acylation of the corresponding 3-hydroxyimino substances. Typically, 17α-ethynyl-3-hydroxyimino-5α-androstan-17β-ol is contacted with acetic anhydride and pyridine at room temperature to yield 3-acetoxyimino-17α-ethynyl-5α-androstan-17β-ol. Reaction of that substance with an acylating agent at elevated temperature results in acylation of the 17-hydroxy group also. When the acylating agent is, for example, diphenylacetic anhydride, the resulting product is 17α-ethynyl-3-diphenylacetoxyimino-5α-androstan-17β-ol 17-diphenylacetate.

The compounds of this invention are useful in consequence of their valuable pharmacological properties. They are, for example, hormonal agents as is evidenced by their anabolic, androgenic, and estrogenic properties. They are, furthermore, hypocholesterolemic agents in consequence of their ability to effect reduction in blood plasma cholesterol levels.

The invention will appear more fully from the examples which follow. These examples are set forth by way of illustration only and it will be understood that the invention is not to be construed as limited either in spirit or in scope by the details contained therein as many modifications both in materials and in methods will be apparent from this disclosure to those skilled in the art. In these examples, temperatures are given in degrees centigrade (° C.) and quantities of materials in parts by weight unless otherwise noted.

EXAMPLE 1

Method A

To a solution of 105 parts of potassium metal in 960 parts of tertiary-amyl alcohol is added, at 0–5°, 840 parts of dry ether followed by acetylene until the initial rapid uptake of that gas ceases. To that mixture is then added 105 parts of 3β-hydroxy-5α-androstan-17-one, and the mixture is stirred at 0–5° for about 3 hours longer, during which time the addition of acetylene gas is continued. The addition of acetylene is then discontinued, and the reaction mixture is stirred at room temperature for about 18 hours longer. To that mixture, cooled to 0–5° is then added gradually with stirring 1200 parts by volume of 20% aqueous ammonium chloride. The organic solvents are removed by steam distillation, and the residual aqueous slurry is filtered in order to separate the product. The filter cake is washed with water, then dried and recrystallized from aqueous methanol to yield pure 17α-ethynyl-5α-androstane-3β,17β-diol, melting at about 260–262°.

To a suspension of 10 parts of chromium trioxide in 100 parts of pyridine is added, with stirring and cooling, a solution of 10 parts of 17α-ethynyl-5α-androstane-3β,17β-diol in 100 parts of pyridine. The resulting reaction mixture is stirred at room temperature for about 3 hours, then is allowed to stand at room temperature for about 16 hours. Dilution of the reaction mixture with approximately 800 parts of water results in precipitation of the crude product which is separated by filtration, washed on the filter with water and dried. Continuous extraction of that brown powdery material with chloroform over a period of about 24 hours affords an organic solution which is concentrated to dryness under reduced pressure to yield a solid residue. That solid material is washed thoroughly with aqueous acetone to yield pure 17α-ethynyl-17β-hydroxy-5α-androstan-3-one, melting at about 297–300° and characterized further by an optical rotation, in pyridine, of −24°.

Method B

A solution of 34 parts of potassium metal in 400 parts of tertiary-amyl alcohol is cooled to 0–5°, then diluted with 350 parts of dry ether. Acetylene gas is bubbled into the mixture, with stirring, until absorption ceases, at which time 33.4 parts of 5α-androstane-3,17-dione 3-dimethyl ketal is added. Stirring of that mixture at 0–5° is continued for about 3 hours, during which time the addition of acetylene is continued. Storage of the reaction mixture at about 5° for about 16 hours followed by dilution with 500 parts by volume of 20% aqueous ammonium chloride affords an aqueous and an organic layer. The organic layer is separated, washed with a 1:1 mixture of 2 N aqueous potassium bicarbonate and 20% aqueous sodium sulfate, then dried over anhydrous sodium sulfate and stripped of solvent under reduced pressure. The resulting residue is dissolved in methanol containing 1% of pyridine, and the resulting solution is diluted with water to afford long needle-like crystals of 17α-ethynyl-17β-hydroxy-5α-androstan-3-one 3-dimethyl ketal, melting at about 162–164°. This compound displays an optical rotation, in methanol, of −29°.

To a solution of 7.8 parts of 17α-ethynyl-17β-hydroxy-5α-androstan-3-one 3-dimethyl ketal in 40 parts of acetone is added 0.08 part of p-toluenesulfonic acid monohydrate, and the resulting reaction mixture is allowed to stand at room temperature for about 15 minutes. Filtration of the mixture at the end of that time affords the crude product which is washed thoroughly with acetone to yield pure 17α-ethynyl-17β-hydroxy-5α-androstan-3-one, melting at about 301–304°.

EXAMPLE 2

A solution of 12.5 parts of 17α-ethynyl-17β-hydroxy-5α-androstan-3-one and 5.5 parts of hydroxylamine hydrochloride in 250 parts of pyridine is heated on the steam bath for about one hour, then is cooled and poured into approximately 2500 parts of water. The resulting precipitate is collected by filtration, washed on the filter with water and dried to afford the crude product, melting at about 240–242°. Recrystallization of that material from aqueous ethanol results in pure 17α-ethylnyl-3-hydroxyimino-5α-androstan-17β-ol, melting at about 242–244°. This compound exhibits an optical rotation, in chloroform, of −42° and is further characterized by the following structural formula

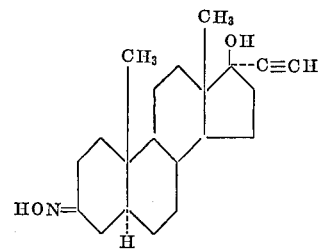

EXAMPLE 3

The substitution of an equivalent quantity of butyne in the procedure of Method A of Example 1 results in 17α-butynyl-5α-androstane-3β,17β-diol.

By substituting an equivalent quantity of 17α-butynyl-5α-androstane-3β,17β-diol and otherwise proceeding according to the processes described in Method A of Example 1, there is obtained 17α-butynyl-17β-hydroxy-5α-androstan-3-one.

The substitution of an equivalent quantity of 17α-butynyl-17β-hydroxy-5α-androstan-3-one in the procedure of Example 2 results in 17α-butynyl-3-hydroxyimino-5α-androstan-17β-ol.

EXAMPLE 4

A solution containing 3.2 parts of 17α-ethynyl-17β-hydroxy-5α-estran-3-one and 1.5 parts of hydroxylamine hydrochloride in 60 parts of pyridine is heated at 90–100° for about one hour, then is poured into approximately 600 parts of water. The resulting precipitated solids are collected by filtration, washed on the filter with water and dried to afford the crude product, melting at about 157–160°. Recrystallization from aqueous methanol affords feathery needle-like crystals of pure 17α-ethynyl-3-hydroxyimino-5α-estran-17β-ol, melting at about 160–165°. This compound displays an optical rotation, in chloroform, of —38° and can be represented by the following structural formula

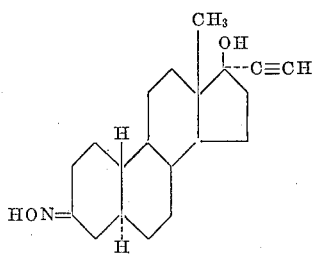

EXAMPLE 5

To a solution of 15.8 parts of 17α-ethynyl-5α-androstane-3β,17β-diol in 200 parts of pyridine is added 1.6 parts of 5% palladium-on-carbon catalyst, and the resulting mixture is shaken with hydrogen at atmospheric pressure and room temperature until one molecular equivalent of hydrogen has been absorbed. The catalyst is removed by filtration, and the filtrate is evaporated to dryness under reduced pressure. Crystallization of the solid residue from aqueous ethanol produces 17α-vinyl-5α-androstane-3β,17β-diol in the form of fine needle-like crystals, melting at about 209–210°.

To a cold stirred suspension of 3.2 parts of chromium trioxide with 30 parts of pyridine is added a solution of 3.18 parts of 17α-vinyl-5α-androstane-3β-17β-diol in 30 parts of pyridine. The resulting reaction mixture is stirred at room temperature for about 6 hours, then is kept at that temperature for about 18 hours longer. Dilution of that mixture with approximately 600 parts of water affords a precipitate, which is collected by filtration, washed on the filter with water and dried. Extraction of the dried solid with boiling chloroform affords an organic solution which is evaporated to dryness under reduced pressure. The resulting solid residue is recrystallized from ethyl acetate to produce 17β-hydroxy-17α-vinyl-5α-androstan-3-one as prismatic crystals, melting at about 165–167° and displaying an optical rotation, in chloroform, of +24°.

A solution of 9.5 parts of 17β-hydroxy-17α-vinyl-5α-androstan-3-one and 4.2 parts of hydroxylamine hydrochloride in 20 parts of pyridine is heated on the steam bath for about one hour, then is cooled and poured into approximately 2000 parts of water. The resulting precipitated product is collected by filtration, washed on the filter with water and dried to afford 3-hydroxy-imino-17α-vinyl-5α-androstan-17β-ol, melting at about 226–229°. Recrystallization from aqueous ethanol affords fine needle-like crystals of that compound, melting at about 230–231°. It displays an optical rotation of +22° in chloroform and is further characterized by the following structural formula

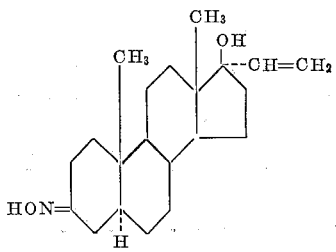

EXAMPLE 6

A solution of 1.57 parts of 17α-ethynyl-17β-hydroxy-5α-androstan-3-one and 0.84 part of methoxyamine hydrochloride in 30 parts of pyridine is prepared, then heated at 90–100° for about one hour. The mixture is cooled and poured into approximately 300 parts of water, and the precipitate which forms is collected by filtration, washed with water on the filter, then dried to afford 17α-ethynyl-3-methoxyamino-5α-androstan-17β-ol, melting at about 218–223°. Recrystallization from aqueous ethanol results in small needle-like crystals, melting at about 222–226° and exhibiting an optical rotation of —25° in chloroform. This substance can be represented by the following structural formula

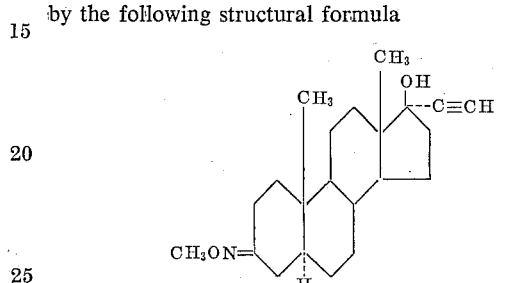

EXAMPLE 7

By substituting an equivalent quantity of ethoxyamine hydrochloride and otherwise proceeding according to the processes described in Example 6, there is obtained 3-ethoxyimino-17α-ethynyl-5α-androstan-17β-ol.

EXAMPLE 8

By substituting an equivalent quantity of 17α-butynyl-5α-androstane-3β,17β-diol and otherwise proceeding according to the processes described in Example 5, there is obtained 17α-butenyl-5α-androstane-3β,17β-diol.

The oxidation of an equivalent quantity of 17α-butenyl-5α-androstane-3β,17β-diol according to the procedure described in Example 5 results in 17α-butenyl-17β-hydroxy-5α-androstan-3-one.

The reaction of an equivalent quantity of 17α-butenyl-17β-hydroxy-5α-androstan-3-one with hydroxylamine hydrochloride by the procedure described in Example 5 results in 17α-butenyl-3-hydroxyimino-5α-androstan-17β-ol.

EXAMPLE 9

The reaction of equivalent quantities of 17β-hydroxy-17α-vinyl-5α-androstan-3-one and ethoxyamine hydrochloride according to the procedure described in Example 6 results in 3-ethoxyimino-17α-vinyl-5α-androstan-17β-ol.

EXAMPLE 10

To a suspension of 6.3 parts of 17α-ethynyl-17β-hydroxy-5α-androstan-3-one in 126 parts by volume of a 1:1 mixture of acetic acid and acetic anhydride is added 2 parts of p-toluene sulfonic acid monohydrate, and the resulting reaction mixture is stirred at room temperature until homogeneous, then is kept at that temperature for about 16 hours. Dilution with approximately 3000 parts of water affords a mixture, which is stirred at room temperature for about one hour, then is extracted with ethyl acetate. The organic layer is separated, washed successively with water and 1 N aqueous potassium bicarbonate, then dried over anhydrous sodium sulfate and concentrated to dryness under reduced pressure to afford crystalline 17α-ethynyl-5α-androst-2-ene-3,17β-diol 3,17-diacetate.

To a solution of 8.1 parts of 17α-ethynyl-5α-androst-2-ene-3,17β-diol 3,17-diacetate in 576 parts of methanol containing 40 parts of water is added a solution of 5.5 parts of potassium carbonate in 40 parts of water. The resulting clear solution is allowed to stand at room temperature for about 5 minutes, then is neutralized with 5 parts of acetic acid. That solution is concentrated to a small volume under reduced pressure, then is diluted with approximately 500 parts of water. The solid product which separates is collected by filtration, washed with water and dried. Recrystallization of that crude product from cyclohexane affords 17β-acetoxy-17α-ethynyl-5α-androstan-3-one as needle-like crystals, melting at about 192–194°. It exhibits an optical rotation, in chloroform, of —23°.

A solution of 3.5 parts of 17β-acetoxy-17α-ethynyl-5α-androstan-3-one and 1.39 parts of hydroxylamine hydrochloride in 30 parts of pyridine is stored at room temperature for about 24 hours, then is poured into approximately 3000 parts of water. The product is separated by filtration, washed with water and dried to afford pure 17α-ethynyl-3-hydroxyimino-5α-androstan-17β-ol 17-acetate, melting at about 211–215° and displaying an optical rotation of —31° in chloroform. This compound is represented by the following structural formula

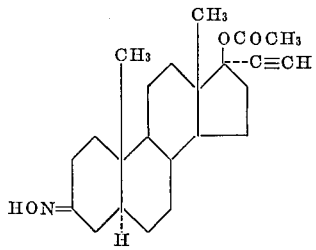

EXAMPLE 11

The substitution of equivalent quantities of propionic acid and propionic anhydride in the procedure of Example 10 results in 17α-ethynyl-5α-androst-2-ene-3,17β-diol 3,17-dipropionate.

The hydrolysis of an equivalent quantity of 17α-ethynyl-5α-androst-2-ene-3,17β-diol 3,17-dipropionate by the procedure described in Example 10 results in 17α-ethynyl-17β-propionoxy-5α-androstan-3-one.

The reaction of an equivalent quantity of 17α-ethynyl-17β-propionoxy-5α-androstan-3-one with hydroxylamine hydrochloride by the procedure described in Example 10 results in 17α-ethynyl-3-hydroxyimino-5α-androstan-17β-ol 17-propionate.

EXAMPLE 12

A solution of one part of 17α-ethynyl-3-hydroxyimino-5α-androstan-17β-ol, 3 parts of acetic anhydride, and 25 parts of pyridine is allowed to stand at room temperature for about 24 hours, then is poured into approximately 1000 parts of water and stirred at room temperature for about one hour. The resulting precipitated product is collected by filtration, washed on the filter with water and dried to afford the crude product, melting at about 126–144°. Recrystallization from aqueous isopropyl alcohol affords 3-acetoxyimino-17α-ethynyl-5α-androstan-17β-ol as a microcrystalline powder, melting at about 140–150°. It exhibits an optical rotation, in chloroform, of —18° and can be represented by the following structural formula

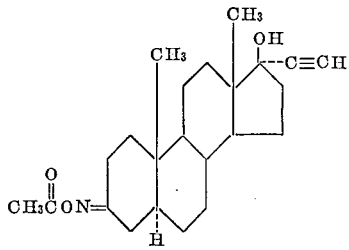

EXAMPLE 13

By substituting an equivalent quantity of propionic anhydride and otherwise proceeding according to the processes described in Example 12, there is obtained 17α-ethynyl-3-propionoxyimino-5α-androstan-17β-ol.

EXAMPLE 14

A solution of 3.3 parts of 17α-ethynyl-3-hydroxyimino-5α-androstan-17β-ol and 5.9 parts of p-chlorobenzoic anhydride in 150 parts of pyridine is allowed to stand at room temperature for about 16 hours, then is diluted with approximately 15 parts of water. The resulting solution is heated on a steam bath for about one hour, then is cooled and poured into approximately 3000 parts of water. The precipitated product is collected by filtration, washed on the filter with water and dried to afford 3 - p - chlorobenzoyloximino - 17α - ethynyl-5α-androstan-17β-ol, melting at about 185–191° Recrystallization from aqueous methanol affords needle-like crystals of the latter product, possessing that identical melting point. This compound exhibits an optical rotation of —4° in chloroform and is characterized by the following structural formula

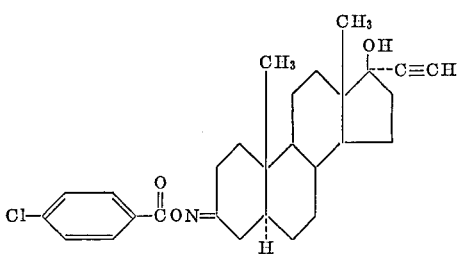

EXAMPLE 15

A solution of one part of 17α-ethynyl-3-hydroxyimino-5α-androstan-17β-ol and 1.7 parts of p-methoxybenzoic anhydride in 25 parts of pyridine is allowed to stand at room temperature for about 24 hours, then is diluted with approximately 5 parts of water. The resulting mixture is heated on the steam bath for about one hour, then is cooled and poured carefully into approximately 1000 parts of water. The solid product which precipitates is collected by filtration, washed on the filter with water, and dried to afford 17α-ethynyl-3-p-methoxybenzoyloxyimino-5α-androstan-17β-ol, melting at about 175–180°. Recrystallization from aqueous ethanol affords that compound as needle-like crystals, melting at about 186–190°. It exhibits an optical rotation, in chloroform, of —20° and is represented by the following structural formula

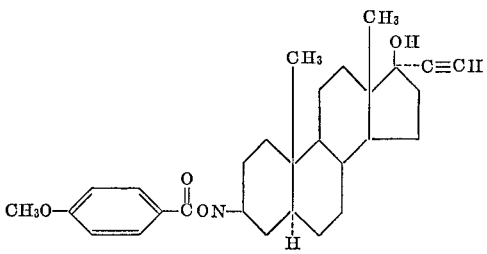

EXAMPLE 16

The substitution of an equivalent quantity of b-ethoxybenzoic anhydride in the procedure of Example 15 results in 3 - p - ethoxybenzoyloxyimino-17α-ethynyl-5α-androstan-17β-ol.

EXAMPLE 17

A solution of 1.6 parts of 17α-ethynyl-3-hydroxyimino-5α-androstan-17β-ol and 6.1 parts of diphenylacetic anhydride in 25 parts of pyridine is heated on the steam bath for about 2 hours, then is diluted with approximately 5 parts of water. Heating is continued for about one hour, after which time the mixture is poured carefully into 500 parts of water. The precipitate which forms is collected by filtration, then washed on the filter with water and dried to produce the crude product. Recrystallization from isopropyl alcohol affords needle-like crystals of pure 17α - ethynyl-3-diphenylacetoxyimino-5-α- androstan-17β-ol 17-diphenylacetate, melting at about 181–185° and exhibiting an optical rotation, in chloroform, of +4°. This compound can be represented by the following structural formula

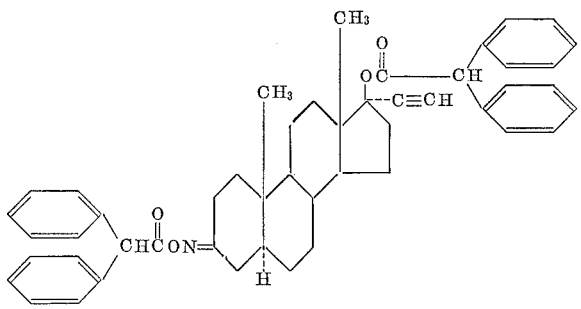

EXAMPLE 18

By substituting an equivalent quantity of 17α-ethynyl-3-hydroxyimino-5α-androstan-17β-ol 17-acetate and otherwise proceeding according to the processes described in Example 12, there is obtained 3-acetoxyimino-17α-ethynyl-5α-androstan-17β-ol 17-acetate.

What is claimed is:
1. A compound of the formula

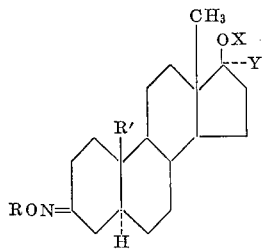

wherein R is selected from the group consisting of hydrogen, lower alkyl, and radicals of the formula

Z being a member of the class consisting of lower alkyl, p-chlorophenyl, p-(lower alkoxy)phenyl, and benzhydryl radicals, R' is a member of the class consisting of hydrogen and a methyl radical, X is selected from the group consisting of hydrogen and a radical of the formula

A being a member of the class consisting of lower alkyl and benzhydryl radicals, and Y is a lower aliphatic unsaturated hydrocarbon radical.

2. 17α-ethynyl-3-methoxyimino-5α-androstan-17β-ol.
3. 17α-ethynyl-3-hydroxyimino-5α-estran-17β-ol.
4. 17α-ethynyl - 3 - hydroxyimino-5α-androstan-17β-ol 17-acetate.
5. 3 - p - chlorobenzoyloxyimino-17α-ethynyl-5α-androstan-17β-ol.
6. 3-acetoxyimino-17α-ethynyl-5α-androstan-17β-ol.
7. 3 - p - methoxybenzoyloxyimino-17α-ethynyl-5α-androstan-17β-ol.
8. 3-diphenylacetoxyimino - 17α - ethynyl-5α-androstan-17β-ol 17-diphenylacetate.
9. A compound of the formula

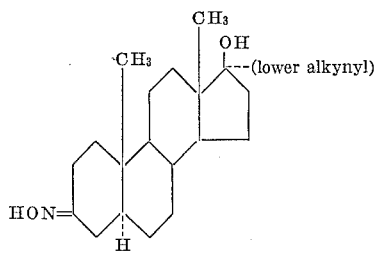

10. 17α-ethynyl-3-hydroxyimino-5α-androstan-17β-ol.
11. A compound of the formula

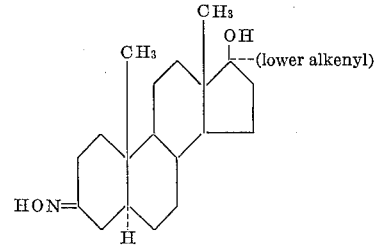

12. 3-hydroxyimino-17α-vinyl-5α-androstan-17β-ol.

References Cited by the Examiner
UNITED STATES PATENTS
3,060,205   10/1962   Schwenk et al. _____ 260—397.5

OTHER REFERENCES
Schmitt et al.: Bull. Soc. Chem., France, pages 1855–1863 (1962).

LEWIS GOTTS, *Primary Examiner.*

H. A. FRENCH, *Assistant Examiner.*

UNITED STATES PATENT OFFICE
CERTIFICATE OF CORRECTION

Patent No. 3,299,107                      January 17, 1967

Robert H. Mazur

It is hereby certified that error appears in the above numbered patent requiring correction and that the said Letters Patent should read as corrected below.

Column 1, lines 16 to 25, the upper right-hand portion of the formula should appear as shown below instead of as in the patent:

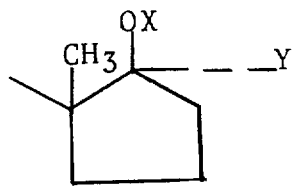

column 1, line 47, for the formula reading $C_nH_{2h-1}$          read          $C_nH_{2n-1}$ line 49, for the formula reading $C_nH_{2h-3}$          read          $C_nH_{2n-3}$ column 4, line 45, for "ethylnyl" read -- ethynyl --; column 5, line 55, for "20" read -- 200 --; column 8, line 75, for "5-α-" read -- 5α- --; line 60, for "b-ethoxy-" read -- p-ethoxy- --.

Signed and sealed this 28th day of November 1967.

(SEAL)
Attest:

EDWARD M. FLETCHER, JR.                 EDWARD J. BRENNER
Attesting Officer                      Commissioner of Patents